United States Patent [19]

Zaugg

[11] 4,312,179

[45] Jan. 26, 1982

[54] GAS TURBINE POWER PLANT WITH AIR RESERVOIR AND METHOD OF OPERATION

[75] Inventor: Paul Zaugg, Baden, Switzerland

[73] Assignee: BBC Brown, Boveri & Company, Ltd., Baden, Switzerland

[21] Appl. No.: 25,574

[22] Filed: Mar. 30, 1979

[30] Foreign Application Priority Data

May 8, 1978 [CH] Switzerland .......................... 4924/78

[51] Int. Cl.³ .............................................. F02C 7/26
[52] U.S. Cl. ................................. 60/39.02; 60/39.04; 60/39.14 M
[58] Field of Search ............ 60/39.02, 39.14 M, 39.04, 60/39.17

[56] References Cited

U.S. PATENT DOCUMENTS

| 2,365,551 | 12/1944 | Hermitte | 60/39.14 M |
| 2,482,791 | 9/1949 | Nettel et al. | 60/39.14 M |
| 2,584,232 | 2/1952 | Sedille | 60/39.17 |
| 2,962,597 | 11/1960 | Evans | 60/39.14 M |
| 3,704,586 | 12/1972 | Bruns | 60/39.14 M |
| 3,866,058 | 2/1975 | Lenssen | 60/39.02 |
| 3,869,857 | 3/1975 | Margen | 60/39.02 |
| 4,033,114 | 4/1977 | Zaugg | 60/39.02 |
| 4,043,120 | 8/1977 | Hoffeins | 60/39.14 M |

Primary Examiner—Louis J. Casaregola
Attorney, Agent, or Firm—Burns, Doane, Swecker & Mathis

[57] ABSTRACT

A gas turbine power plant is disclosed which uses gas turbine engine components in conjunction with an air reservoir and a motor-generator. The compressor unit has low pressure, intermediate pressure and high pressure compressors and control valves which allow operation of the low pressure compressor by a low power auxiliary motor during starting while the other compressors do not absorb significant power. The power plant can operate by the motor-generator to charge the reservoir, can operate on the air cell with a turbine during peak load, and can function as a conventional gas turbine installation when the air reservoir is exhausted.

4 Claims, 1 Drawing Figure

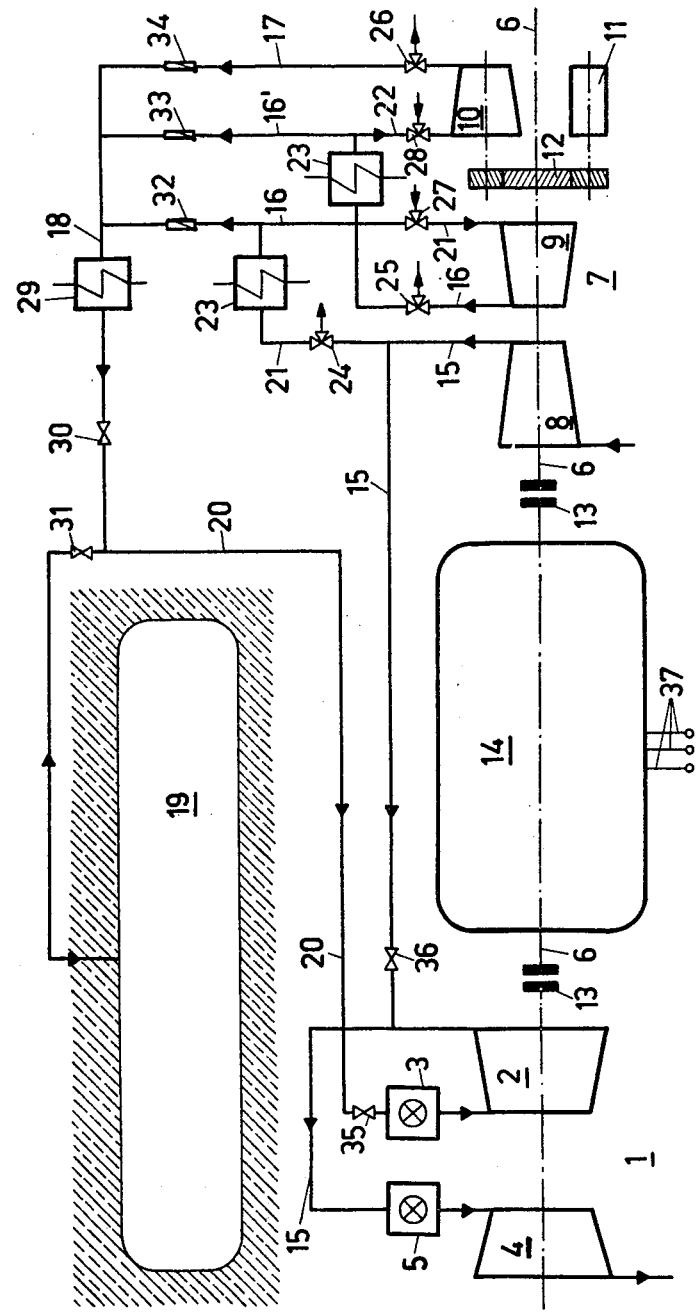

GAS TURBINE POWER PLANT WITH AIR RESERVOIR AND METHOD OF OPERATION

BACKGROUND OF THE INVENTION

The present invention relates generally to power plants. More particularly, the invention concerns a method for operating a gas turbine power plant with an air reservoir cell when the air reservoir cell is empty as well as an installation for performing the method.

Gas turbine power plants with air reservoir cells have been used in the past. Typically, these gas turbine power plants include a compressor unit which supplies combustion air to a gas turbine combustion chamber as well as for filling the air reservoir cell. These units include an auxiliarly prime mover in addition to an electric power generator. During starting of the gas turbine compressor unit, the electrical generator of these known devices was electrically connected to the driving motor for the compressor unit through a power line separate from the electric power network. In a frequency acceleration mode, the compressor was accelerated from 0 rpm, i.e., from standstill, up to line frequency of the generator. When the compressor unit was operating at line frequency, the drive motor for the compressor unit was switched to the auxiliary power line so that the input drive power for the compressor unit was supplied from the auxiliary power line. During this operation, the generators could supply electrical current into the power net or could be shut down (cf. BBC Report No. 65/1975, 7/8).

With the known prior art arrangements, the auxiliary prime mover must have a high power output capacity. Accordingly an especially disadvantageous effect, namely the great economic cost, is associated with these earlier approaches.

It is an object to the present invention to provide a method and apparatus in which a relatively low capacity compressor unit for the gas turbine power plant can supply the power plant with the required combustion air when the air reservoir is empty.

The foregoing object as well as many others are solved according to the present invention by utilizing an auxiliary motor to drive a compressor unit which has at least a low pressure compressor. Compressed air from the low pressure compressor is ducted to a low pressure combustion chamber and then to a low pressure turbine component. When timing speed is attained, air in the combustion chamber is ignited along with fuel and the gas turbine power plant is accelerated to a rated speed corresponding to the line frequency. At this point, a motor-generator is switched into the power net. An advantage of the method according to the present invention is more clearly seen in that a device having a low power output capacity can be utilized as the auxiliary motor. Moreover, the auxiliary motor does not require a special auxiliary power line with the result that a special starting unit is not required.

In addition, it is possible to disconnect the gas turbine power plant from the motor-generator to pressurize the air reservoir cell. Moreover, the motor-generator can take power from the power line and switch in sequentially a medium pressure compressor and a high pressure compressor which also are components of the compressor unit. The sequential engagement of the medium and high pressure compressors depends upon the load status of the air reservoir. In a case of generator operation with an empty air reservoir cell, a high pressure turbine component of the gas turbine power plant begins operation and the compressor unit assumes sole responsibility for supply of air to the combustion chambers for the gas turbine power plant.

According to the method of the present invention, during starting of the gas turbine power plant, the medium and high pressure compressors of the compressor unit are operable to pressurize atmospheric air and supply that air to the turbine section of the gas turbine power plant.

According to another feature of the method, the high pressure turbine of the turbine section receives a reduced air flow during acceleration of the system. This reduced air flow prevents overheating in the high pressure turbine component, since the combustion chamber for the high pressure turbine has not been ignited during the acceleration.

The apparatus of the present invention includes a gas turbine power plant having a multi-section turbine and a multi-section compressor unit, both of which are arranged on a common shaft with a motor-generator. The compressor and turbine units are selectively disengageable with the motor-generator. The low pressure compressor is in fluid communication with the discharge of the low pressure compressor. In addition, the discharge outlets for the low pressure compressor, the medium pressure compressor and the high pressure compressor each communicate with the air reservoir cell as well as a high pressure combustion chamber for the turbine by means of a common duct.

The apparatus also includes a valving arrangement which permits connection of the low pressure compressor with the low pressure turbine unit while the medium pressure and high pressure compressor components discharge to atmospheric pressure during starting. As a result, a very low output capacity starting motor can be used to drive the compressor unit.

BRIEF DESCRIPTION OF THE DRAWING

The above and many objects and advantages of the present invention will apparent to those skilled in the art when this specification is read in conjunction with the drawing wherein like reference numerals has been applied to like elements and wherein the FIGURE is a schematic illustration of the constituent components of the apparatus.

DESCRIPTION OF THE PREFERRED EMBODIMENT

The FIGURE illustrates a schematic diagram for the gas turbine power plant which includes a turbine section 1 having a high pressure turbine component 2 and a low pressure turbine component 4. Each turbine component is in fluid communication with a corresponding combustion chamber 3, 5. The high pressure combustion chamber 3 receives high pressure air and fuel whereas the low pressure combustion chamber 5 receives low pressure air and fuel. A common shaft 6 has the turbine section 1 mounted thereon as well as a compressor section 7 and an electric machine 14. The machine 14 may be a motor-generator or a separate motor with a separate generator. The compressor section 7 includes a low pressure compressor 8, a medium or intermediate pressure compressor 9 and a high pressure compressor 10. An auxiliary starting motor 11 cooperates with a gear unit 12 to drive the compressor section 7. Typically, the gear unit 12 will be a reduction gear assembly and is used only during starting.

Selectively disconnectable couplings 13a, 13b on the shaft 6 allow selective engagement between the turbine section 1, the compressor section 7 and the motor-generator 14. A discharge line 15 establishes fluid communication between the low pressure compressor 8 and the low pressure turbine 4. In addition, this discharge line 15 passes through the low pressure combustion chamber 15 where fuel may be introduced to support combustion. A line 21 provides fluid communication between the discharge line 15 and the intake to the intermediate pressure compressor 9. A common supply duct 18 communicates with an air reservoir cell 19 as well as with discharge lines 16, 16' and 17. The discharge lines 16, 16' and 17 communicate respectively with the outlet of a low pressure compressor 8, the intermediate pressure compressor 9 and the high pressure compressor 10. In addition, the air reservoir cell 19 is connected through a branch circuit 20 with the high pressure combustion chamber 3 and thereby to the high pressure turbine component 2.

The line 21 described above also provides fluid communication between the outlet from the low pressure compressor 8 and the inlet to the intermediate pressure compressor 9. The outlet of the intermediate pressure compressor 9 is connected to the intake of the high pressure compressor 10 by means of a duct 22. This duct 22 also communicates with the discharge line 16' discussed above. The line 21 and the duct 22 are each provided with an intermediate cooler 23 so as to reduce the temperature of gases being supplied to successive stages of pressurization.

At the discharge from each of the compressor sections 8, 9, 10 a corresponding blowoff valve 24, 25, 26 is provided. The blowoff valves are preferably designed as threeway valves. In one position, each bypass valve 27, 28 permits the respective compressor to receive atmospheric air and pressurize the atmospheric air without introducing successive stages of pressurization to previously compressed air. In a second position, the valves 27, 28 allow successive staging of pressurization by the compressors 8, 9, 10.

In each duct 21, 22, a bypass valve 27, 28 respectively is provided. The blowoff valves 24, 25, 26 also allow the compressors 9, 10 to discharge to atmospheric pressure.

The common duct 18 is also provided with a cooler 29 to lower temperature of the compressed air passing therethrough. In addition, a pair of shut off valves 30, 31 are provided to control fluid communication between the duct 18, the branch conduit 20 and the line passing into the air reservoir cell 19.

In order to prevent the backflow of pressurized air from the cell 19 into the discharge lines 16, 16', 17, each discharge line is provided with a corresponding check valve 32, 33, 34.

A valve 35 is installed in the branch conduit 20 adjacent to the high pressure combustion chamber 3 to regulate the flow of pressurized air between the high pressure combustion chamber 3 and the conduit 20. In addition, a valve 36 is arranged in the outlet of the line 15. The direction of fluid flow through the various conduits, ducts and lines is illustrated generally by the arrows in the FIGURE. While the conduit communicating with the air reservoir cell 19 has arrow heads in mutually opposed directions, this representation indicates that flow can enter the cell 19 or can leave the cell 19 depending upon the settings of the respective valves.

Electrical connections 37 are provided to establish electrical contact between the motor-generator 14 and a suitable conventional power net.

Operation of the gas turbine power plant in accordance with the present invention will now be described. At the beginning of a starting procedure, the coupling 13a between the turbine section 1 and the motor-generator 14 as well as the coupling 13b between the motor-generator 14 and the compressor section 7 are engaged so that there is power transmitting relationship between the turbine section 1, the compressor section 7 and the motor-generator 14. In addition, the blowoff valve 24 in the discharge from the low pressure compressor 8 is positioned so that the low pressure compressor does not communicate with atmosphere or with the line 18 communicating with the reservoir 19. In addition, the valve 35 leading to the high pressure combustion chamber 3 is closed while the valve 36 and the conduit 15 remain open. To further prepare the power plant for starting, the blowoff valves 25, 26 are opened to establish fluid communication with atmospheric pressure at the discharge of both the intermediate compressor 9 and the discharge of the high pressure compressor 10. At the same time, the bypass valves 27, 28 are adjusted so as to permit atmospheric air to be ingested into the inlet of the intermediate pressure compressor 9 and the high pressure compressor 10, respectively.

With the foregoing valve adjustments, the intermediate pressure compressor 9 and the high pressure compressor 10 suck in atmospheric air and discharge it at atmospheric pressure so as to do a minimal amount of work. Accordingly, the intermediate and high pressure compressors 9, 10 do not require substantial energy input. That is, there is only a minimal resistance to rotation of the shaft 6 in the intermediate pressure and high pressure compressors 9, 10. In this fashion, a low output capacity motor can be employed to start the compressor 8. For this purpose, the small auxiliary motor 11 has been provided.

Once the auxiliary motor 11 has been started, the low pressure compressor 8 supplies air through the line 15 directly to the low pressure combustion chamber 5. From the low pressure combustion chamber 5 the air is directed into the low pressure turbine 4 where it expands to a lower pressure.

When the low pressure turbine 4 reaches its timing speed, fuel is introduced into the low pressure combustion chamber 5 and is ignited so that hot combustion gases exhaust into the low pressure turbine 4. Accordingly, the power plant is accelerated by the low pressure turbine 4 to the rated speed or line frequency. To prevent a reverse flow of gases through the high pressure turbine 2 and avoid any potential overheating of this component, it is possible to open the shutoff valve 35, the valve 30 and to position at least one of the valves 24, 25, 26 so that air can enter the duct 18 and the branch conduit 20. During this operation, it is to be understood that the valve 31 is closed so that there is no communication between the air reservoir cell and the high pressure combustion chamber 3. Preferably, the valve 35 and valve 30 will be opened only to an extent that a restricted connection with the high pressure turbine 2 occurs so that air flow through the high pressure turbine is only sufficient purge that component and eliminate heat accumulations.

As soon as the full speed of the motor-generator 14 is attained, i.e., the line frequency, the motor-generator 14 is switched into the power line through the connections 37 and begins to operate as a drive motor. At this time, combustion in the low pressure combustion chamber 5 is extinguished by, for example, starving the air flow of fuel. Then the valve 35 is closed. When the valve 35 is closed, the control valve 31 for the air reservoir cell 19 is opened and the blowoff valve 24 is adjusted so that all air pressurized by the low pressure compressor 8 exhausts to the atmosphere. The valve 36 in the conduit 15 is also closed and the coupling 13a is disconnected so that the turbine section 1 is mechanically independent of the motor-generator 14 and the compressor section 7. From this point forward, the low pressure compressor 8 discharges through the exhaust line 15 to the duct 21, through the intercooler 23, the check valve 32 and supply line 18 to pressurize the air reservoir cell 19.

When the air reservoir cell 19 has attained the pressure comparable to that produced by the low pressure compressor, the bypass valve 27 may be adjusted to establish fluid communication between the discharge of the low pressure compressor 8 through the conduits 15, 21 to the intermediate pressure compressor 9. The outlet of the intermediate compressor 9 is then connected through its valve 25 with the conduit 22 and discharge conduit 16. The check valve 32 prevents the higher pressure discharge air from the intermediate compressor 9 from flowing through duct 18 and into the duct 16. Accordingly, further pressurization of the air reservoir cell 19 is effected by a series or staged compression utilizing both the low pressure compressor 8 and the intermediate pressure compressor 9.

To further increase the pressure in the air reservoir cell 19, it is necessary to switch the high pressure compressor 10 into operation by suitably adjusting the bypass valve 28 and the blowoff valve 26 so that fluid communication is established between discharge conduit 16 of the intermediate pressure compressor 9 and discharge conduit 17 of the high pressure compressor 10. With this valve configuration, the three compressor components 8, 9, 10 function in successive stages to provide air at a comparatively high pressurization level for the purpose of charging the reservoir 19 to the high pressure.

In the event that the air reservoir 19 becomes fully discharged for any reason at all, or is not available for use, as may be the case in the event of an overhaul, the gas turbine power plant described above can be operated in a conventional gas turbine cycle. For example, after switching the motor-generator 14 into the power net, the blowoff valves 25, 26 and the bypass valves 27, 28 are adjusted so that the low pressure compressor 8, the intermediate compressor 9 and the high pressure compressor 10 function in staged relationship so as to supply high pressure air to the high pressure combustion chamber 3. In the high pressure combustion chamber 3, fuel is introduced into the pressurized air and the combustion products exhaust through the high pressure turbine 2 and then through the low pressure turbine 4 to drive both the motor-generator 14 and the compressor section 7.

It will be noted that during this gas turbine cycle operation, the couplings 13a and 13b must be engaged so that there is continuous mechanical interconnection between the turbine section 1, the compressor section 7 and the motor-generator 14.

During periods of high power demand, the turbine section 1 is operated from the air reservoir cell 19 by engaging the coupling 13a and disengaging the coupling 13b. With this configuration, fuel introduced into the high pressure combustion chamber 3 is burned with the air from the reservoir to drive both the high pressure turbine 2 and the low pressure turbine 4.

During periods of low demand, the motor-generator 14 functions as a motor with the coupling 13a disconnected and the coupling 13b connected so as to drive the compressor units and pressurize the air cell 19 as described above.

It will now be apparent that there has been provided in accordance with the present invention a novel arrangement for a gas turbine power plant. In addition, it will be apparent to those skilled in the art that numerous modifications, variations, substitutions and equivalents exist for features of this invention which do not materially depart from the spirit and scope thereof. Accordingly, it is expressly intended that all such modifications, variations, substitutions and equivalents which fall within the spirit and scope of this invention as defined in the appended claims be embraced thereby.

What is claimed is:

1. A method of starting a power plant and charging an air reservoir, the power plant having a motor-generator, a compressor with a low-pressure section, a medium-pressure section and a high-pressure section, a turbine with a high-pressure section and a low-pressure section, a combustion chamber, an auxiliary motor and an empty air reservoir cell, comprising the steps of:
    driving the compressor with the auxiliary motor to compress air;
    conducting compressed air from the low-pressure compressor section through the combustion chamber to the low pressure turbine section;
    igniting fuel in the combustion chamber when a timing speed is attained;
    accelerating the power plant to a predetermined speed at which the motor-generator operates at a line frequency;
    switching the motor-generator onto a power line when the line frequency has been attained;
    disconnecting the turbine from the motor-generator;
    driving the motor-generator with power from a power line;
    sequentially connecting the medium-pressure compressor section and the high-pressure compressor section in fluid communication with the low-pressure compressor section and the air reservoir cell depending upon the pressure level of the air reservoir cell.

2. The method of claim 1 further including the steps of:
    removing air from the atmosphere with the medium-pressure and high-pressure compressor sections;
    pressurizing atmospheric air in the medium-pressure compressor section and the high-pressure compressor section during start-up; and
    supplying the compressed atmospheric air to the turbine.

3. The method of claim 1, further including the steps of:
    allowing air flow through the high-pressure turbine section during the acceleration step in sufficient quantity to avoid overheating of the high-pressure turbine section.

4. A method of charging an air reservoir while operating a power plant having a motor-generator, a compressor with a low-pressure section, a medium-pressure section, and a high-pressure section, a turbine with a high-pressure section and a low-pressure section, a combustion chamber, an auxiliary motor, and an air reservoir cell, the method comprising the steps of:
  disconnecting the turbine from the motor-generator;
  driving the motor-generator with power from a power line;
  sequentially connecting the medium-pressure compressor section and the high-pressure compressor section in fluid communication with the low-pressure compressor section and the air reservoir cell depending upon the pressure level of the air reservoir cell.

* * * * *